United States Patent Office 3,746,692
Patented July 17, 1973

3,746,692
RIGID POLYURETHANE COMPOSITIONS
Franciszek Olstowski, Freeport, and Donald B. Parrish, Lake Jackson, Tex., assignors to The Dow Chemical Company, Midland, Mich.
No Drawing. Filed Oct. 21, 1971, Ser. No. 191,343
Int. Cl. C08g 22/16
U.S. Cl. 260—77.5 MA     11 Claims

ABSTRACT OF THE DISCLOSURE

Rigid, rapid setting polyurethane compositions are prepared from (a) a polyol such as a polyether triol having an average molecular weight of about 260, (b) a polyisocyanate such as toluene diisocyanate, (c) a liquid halogenated aliphatic modifier compound having a boiling point below about 150° C. at atmospheric pressure and having a hydroxy substituent which is capable of reacting with an isocyanate group such as 2-chloroethanol, and (d) an organo-metal catalyst such as lead octoate. These compositions instantly set to form polyurethane products which can be demolded within less than about 5 minutes.

---

This invention relates to polyurethane compositions and more particularly relates to rapid-setting, solid, rigid polyurethane compositions, articles produced therefrom and compositions which when mixed with a catalyst will produce a rapid setting polyurethane composition.

It has been taught in a copending application by Franciszek Olstowski and Donald B. Parrish, Ser. No. 179,149, filed on Sept. 9, 1971, for "Non-Elastomeric Polyurethane Compositions," that halogenated aliphatic compounds having boiling points above about 150° C. can be employed as a modifier compound to produce rigid, rapid setting polyurethane compositions.

It has now been unexpectedly discovered that liquid halogenated aliphatic compounds containing a hydroxy substituent reactive with an isocyanate group and having a boiling point below about 150° C. can be employed as a modifier compound to produce rigid, rapid setting polyurethane compositions when mixed with a polyether polyol, an organic polyisocyanate, and a non-amine.

The rigid, rapid-setting, polyurethane compositions of the present invention are obtained by intimately admixing together a composition comprising:

(a) a polyether polyol which is the adduct of a polyhydric initiator compound having a functionality of from 3 to about 8 with a vicinal epoxy compound, said polyol having a hydroxyl equivalent weight of at least about 75 and less than about 230;
(b) an organic polyisocyanate;
(c) a liquid halogen-containing aliphatic modifier compound containing a substituent group reactive with an isocyanate group, said modifier compound having a boiling point below about 150° C. at atmospheric pressure; and
(d) an organo-metal catalyst for urethane formation;

and wherein components A and B are present in amounts so as to provide an NCO:OH ratio of from about 0.8:1 to about 2:1 and preferably from about 0.95:1 to about 1.1:1; component C is present in quantities of from about 0.1 to about 10 and preferably from about 0.2 to about 5 percent by weight of the sum of components A, B and C; and D is present in quantities of from about 0.02 to about 5 percent and preferably from about 0.1 to about 2 percent by weight of the sum of the weights of components A, B and C.

When the liquid modifier compound (component C) is employed in quantities above about 10 percent, the product is a foam-like composition with large irregular cells.

The term rigid polyurethane as employed herein is defined as a polyurethane product having an elongation value of less than 100 percent and a density of at least about 1 gram/cc.

Suitable initiator compounds having from 3 to 8 hydroxyl groups which are employed to prepare the polyols (component A) employed in the present invention include, for example, glycerine, trimethylolpropane, pentaerythritol, sorbitol, sucrose, mixtures thereof and the like.

Suitable vicinal epoxy compounds which may be reacted with the initiator compounds to prepare the polyols employed as component A in the present invention include, for example, the lower alkylene oxides and substituted alkylene oxides such as ethylene oxide, 1,2-propylene oxide, 1,2-butylene oxide, 2,3-butylene oxide, epichlorohydrin, epibromohydrin, epiiodohydrin, styrene oxide, mixtures thereof and the like.

Suitable organo-metal catalysts for urethane formation include, for example, organo-metal compounds of tin, zinc, lead, mercury, cadmium, bismuth, cobalt, antimony, iron and the like such as, for example, metal salts of a carboxylic acid having from about 2 to about 20 carbon atoms including, for example, stannous octoate, dibutyltin dilaurate, dibutyltin diacetate, ferric acetyl acetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids are preferably added as a solution in a solvent. Suitable such solvents include, for example, dioctylphthalate, polyoxyalkylene glycols, mineral spirits, dipropylene glycol, mixtures thereof and the like.

Suitable liquid, halogenated aliphatic compounds which may be employed in the present invention include those halogenated aliphatic compounds having a boiling point below about 150° C. and a hydroxyl substituent which is reactive with an isocyanate group. Preferably, the liquid halogenated aliphatic compounds are monohydroxyl alkanes containing from 2 to 4 carbon atoms and a halogen having an atomic number from 9 to 35.

Suitable such mono-hydroxyl-containing compounds include, for example, those compounds having from 2 to about 4 carbon atoms such as 2-chloroethanol, 2,2-dichloroethanol, 1-chloro-2-propanol, 1-bromo-2-propanol, 1-chloro-2-methyl-2-propanol, 1,1 - dichloro-2-propanol, trifluoroethanol, monofluoroethanol, mixtures thereof and the like.

Suitable polyisocyanates which may be employed as component B in the compositions of the present invention include, for example, any organic polyisocyanate having 2 or more NCO groups per molecule and no other substituents capable of reacting with the hydroxyl groups of the polyoxyalkylene compound. Suitable such polyisocyanates include, for example, 2,4-toluene diisocyanate, 2,6-toluene diisocyanate, xylylene diisocyanate, hexamethylene diisocyanate, p,p'-diphenylmethane diisocyanate, p-phenylene diisocyanate, hydrogenated methylene diphenyl diisocyanate (e.g. Hylene® W), naphthalene diisocyanate, dianisidine diisocyanate, polymethylene polyphenyl isocyanate, mixtures of one or more polyisocyanates and the like.

Other organic isocyanates which may suitably be employed and which are to be included in the term organic polyisocyanate include isocyanate terminated prepolymers prepared from the previously mentioned polyols and the above mentioned isocyanates.

Rigid polyurethane products can be prepared by rapidly mixing the components of the compositions of the present invention. It is preferred to thoroughly blend together the components represented by A, the polyol, B, the polyisocyanate, and C, the liquid modifier compound and then mixing the resultant mixture with component D, the catalyst. Mechanical dispensing devices can be employed by utilizing 2 or more streams of the individual components or mixtures of the components which are introduced into said dispensing device.

Other components including inert fillers such as, for example, sand, microballoons, glass fibers, asbestos, aluminum granules, silicon carbide powder and the like, coloring agents, such as pigments and dyes, including for example, chromic oxide and ferric oxide, mixtures thereof and the like may be employed in the compositions of the present invention without detracting from the scope thereof.

The compositions of the present invention rapidly produce solid products which may be demolded, i.e. the articles produced therefrom may be removed from the mold within about 5 minutes, usually within about 3 minutes and preferably within about 1 minute or less from the time the catalyst is blended into the mixture and do not require the application of external sources of heat to accomplish this, although in some circumstances it may be desirable to post cure the products in order to develop certain properties.

The compositions of the present invention not only can be demolded within 5 minutes and often in less than 2 to 3 minutes, but the cast objects produced therefrom have developed sufficient strength properties to be employed immediately upon cooling to room temperature for their intended purpose. The cast objects are hot or warm to the touch immediately after removing from the mold due to the exotherm generated during the reaction.

This is a valuable contribution to the urethane molding art, in that productivity can be increased employing a given quantity of molds.

The choice of the catalyst involves the desired time delay between the catalyst being mixed into the reagents and the liquid mix "instantly" solidifying. For example, if tolylene diisocyanate is used along with a polyol that is the reaction product of glycerine with propylene oxide and having a molecular weight of about 260 plus a hydroxyl containing halogenated aliphatic compound boiling below about 150° C. as the liquid modifier compound, then the addition of about 1% stannous octoate catalyst will yield a delay or induction time of about 10 seconds before the mixture suddenly "freezes" into a solid. Substitution of dibutyltin dilaurate at the same catalyst level stretches this delay time to about 20 seconds, and phenyl mercuric propionate exhibits a delay time of about 120 seconds before extremely rapid solidification occurs.

The change of isocyanate to a less reactive one, i.e. the substitution of hexamethylene diisocyanate for tolylene diisocyanate, correspondingly increases the delay time before rapid solidification takes place.

Suitable materials from which adequate molds, for casting the compositions of the present invention, may be prepared include polymers such as, for example, polyethylene, polypropylene, their copolymers and the like, such as, for example, polyurethanes, polysiloxane elastomers, Mylar®, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e. the reactants may not be readily demolded unless the mold is preheated to about 50–90° C., especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, decorative objects, furniture or furniture components, gears or other machine components, threaded protective plugs and caps, and the like.

The following examples are illustrative of the present invention, but are not to be construed as to limiting the scope thereof in any manner.

EXAMPLE 1

In a suitable container were thoroughly blended 80 grams of a polyether polyol that is the reaction product of glycerine with propylene oxide in a molar ratio of 1:3 respectively, and having a molecular weight of about 260, 1 cc. (approximately 1.2 grams) of 2-chloroethanol, 80 grams of an 80/20 mixture of the 2,4- and 2,-6-isomers of toluene diisocyanate.

After the above components were well mixed, 0.55 cc. of lead octoate (containing 24% lead) was rapidly stirred in and the resultant mixture was poured into a Myler® tray. Ten seconds after stirring in the catalyst, the mixture suddenly set into a ¼" thick transparent sheet of solid, rigid, polyurethane which was demolded within about 40 seconds after catalyst addition. The resultant rigid, dense, solid casting had a tensile strength of 15,500 p.s.i., an elongation of 8 percent and a density of about 1.1 gram/cc.

EXAMPLE 2

In a suitable container were blended the following components:

50 grams of the reaction product of about 3 moles of propylene oxide with 1 mole of glycerine.
50 grams of an 80/20 mixture of 2,4/2,6-toluene diisocyanate.
5 grams of ethylene chlorohydrin (2-chloroethanol).

After the above components were well mixed, 1 cc. of lead octoate (24% Pb) was added and the mixture was poured into a polyethylene beaker. The liquid mixture instantly solidified into an opaque white solid in about 8 seconds after stirring in the catalyst. In about 15 minutes after catalyst addition, the solid polymer was removed from the mold and had a density of 1.17 grams/cc.

EXAMPLE 3

In a suitable container were blneded the following components, 50 grams of the reaction product of about 3 moles of propylene oxide with 1 mole of glycerine.
50 grams of an 80/20 mixture of 2,4-/2,6-toluene diisocyanate
0.3 gram of ethylene chlorohydrin.

After the addition and mixing of 0.6 cc. of lead octoate (24% lead) the mixture was poured into a polyethylene beaker. After about 10 seconds after catalyst addition, the mixture suddenly solidified and after about 20 seconds after catalyst addition, a solid, white, opaque casting having a density of about 1.2 grams/cc. was removed.

EXAMPLE 4 (COMPARATIVE)

This comparative experiment demonstrates that the use of a boiling halogenated aliphatic modifier in quantities greater than about 10 percent by weight of components A, B, and C results in products having large irregular cells or bubbles and a density below about 1 gram/cc.

In a suitable container were blended the following components.

50 grams of the reaction product of propylene oxide with glycerine in a molar ratio of about 3 to 1 and having an OH equivalent weight of about 87.
50 grams of 80/20 mixture of 2,4-/2,6-toluene isocyanate.
15 grams of ethylene chlorohydrin.

After the addition of 0.6 cc. of lead octoate (24% lead), the mixture was blended and poured into a polyethylene beaker. After about 10 seconds of the catalyst addition, the mixture began to swell and resulted in a foamed casting having large irregular cells or bubbles and a density of 0.55 gram/cc.

EXAMPLE 5 (COMPARATIVE)

This comparative experiment demonstrates that when no low boiling halogenated aliphatic modifier is employed, the resultant castings have large irregular cells or bubbles and a density below about 1 gram/cc.

In a suitable container were blended the following components.

50 grams of the reaction product of propylene oxide with glycerine in a molar ratio of about 3 to 1 and having an OH equivalent weight of about 87.

50 grams of 80/20 mixture of 2,4-/2,6-toluene diisocyanate.

After the addition of 0.6 cc. of lead octoate (24% lead), the mixture was blended and poured into a polyethylene beaker. After about 10 seconds, the mixture solidified and over the next 1- to 4-minute interval, the casting swelled to about 3 times its original volume. The product had a density of about 0.38 gram/cc.

EXAMPLE 6

In a suitable container were blended the following components.

50 grams of the reaction product of about 3 moles of propylene oxide with 1 mole of glycerine,
50 grams of an 80/20 mixture of 2,4-/2,6-toluene diisocyanate,
1 cc. of 1-chloro-2-propanol.

After the addition of 0.1 cc. of lead octoate (24% Pb), the mixture was blended and poured into a polyethylene beaker. After 10 seconds after catalyst addition, the mixture suddenly solidified and after 20 seconds after catalyst addition, a dense, solid casting having a density of 1.18 grams/cc. was removed from the mold.

EXAMPLE 7

In a suitable container were blended the following components:

30 grams of the reaction product of about 4 moles of propylene oxide with 1 mole of pentaerythritol.
30 grams of an 80/20 mixture of 2,4-/2,6-toluene diisocyanate.
1 cc. of ethylene chlorohydrin.

After the addition and blending of 0.6 cc. of lead octoate (24% Pb), the mixture was cast into a polyethylene beaker. After about 8 seconds after catalyst addition, the mixture suddenly solidified and after about 15 seconds after catalyst addition, a solid, rigid casting having a density of 1.07 grams/cc. was removed from the mold.

EXAMPLE 8

In a suitable container were blended the following components.

30 grams of the reaction product of about 4 moles of propylene oxide with 1 mole of pentaerythritol
32 grams of xylylene diisocyanate
1 gram of ethylene chlorohydrin After the addition and blending of 0.5 cc. of lead octoate (24% Pb), the mixture was cast into a polyethylene beaker and after about 25 seconds after catalyst addition, the mixture instantly solidified and after about 45 seconds after catalyst addition, a dense, translucent, white rigid casting having a density of 1.14 grams/cc. was removed from the mold.

Similar rigid rapid setting polyurethane compositions are prepared by following the above procedures and using related halo-hydroxy modifier compounds such as 1-bromo-2-propanol, trifluoroethanol, 1-chloro-2-methyl-2-propanol, alone or mixtures thereof.

We claim:
1. A solid, rigid polyurethane composition which can be demolded within less than about 5 minutes after admixture of a composition which comprises:
   (A) a polyether polyol having from 3 to about 8 hydroxyl groups and a hydroxyl equivalent weight between about 60 and about 230,
   (B) an organic polyisocyanate,
   (C) a liquid halogenated aliphatic modifier compound having a boiling point below about 150° C. at atmospheric pressure and a hydroxy substituent group which is reactive with an isocyanate group, and
   (D) an organo-metallic catalyst for urethane formation, wherein components A and B are present in amounts so as to provide an NCO:OH ratio of from about 0.8:1 to about 2:1, component C is present in quantities of from about 0.1 to about 10 percent by weight of the sum of components A, B and C; and component D is present in quantities of from about 0.02 to about 5 percent by weight of the sum of the weights of components A, B and C.

2. The composition of claim 1 wherein component C is a monohydroxyl alkane containing 2 to 4 carbon atoms and a halogen having an atomic number from 9 to 35.

3. The composition of claim 1 wherein components A and B are present in quantities such that the NCO:OH ratio of the A and B components is from about 0.95:1 to about 1.1:1, component C is present in quantities of from about 0.2 to about 5 percent by weight of the sum of components A, B and C and wherein component D is present in quantities of from about 0.1 to about 2 percent by weight of the sum of the weights of components A, B and C.

4. The composition of claim 3 wherein component C is a monohydroxyl alkane containing 2 to 4 carbon atoms and a halogen having an atomic number from 9 to 35.

5. The composition of claim 3 wherein component D is an organo-metal compound of a metal selected from tin, zinc, lead, mercury, cadmium, bismuth and antimony.

6. The composition of claim 4 wherein component C is selected from 2-chloroethanol, 1-chloro-2-propanol, 2,2-dichloroethanol, 1-bromo-2-propanol, 1-chloro-2-methyl-2-propanol, 1,1-dichloro-2-propanol, 1,3-dichloro-2-propanol, trifluoroethanol, monofluoroethanol and mixtures thereof.

7. The articles resulting from casting the compositions of claim 1.

8. The articles resulting from casting the compositions of claim 2.

9. The articles resulting from casting the compositions of claim 3.

10. The articles resulting from casting the compositions of claim 4.

11. The composition of claim 1 wherein components A and B are present in quantities such that the NCO:OH ratio of the A and B components is from about 0.95:1 to about 1.1:1; component C is present in quantities of from about 0.2 to about 5 percent by weight of the sum of components A, B and C.

References Cited
UNITED STATES PATENTS
3,467,607  9/1969  Kungla et al. ___ 260—77.5 MA
3,635,904  1/1972  Briggs et al. _____ 260—77.5 AP DONALD E. CZAJA, Primary Examiner
M. J. WELCH, Assistant Examiner U.S. Cl. X.R.
252—182; 260—2.5 AP, 37 N, 77.5 AB